Dec. 27, 1955  E. M. TUCKER  2,728,583
CAR BODY LIFT
Filed Aug. 15, 1951
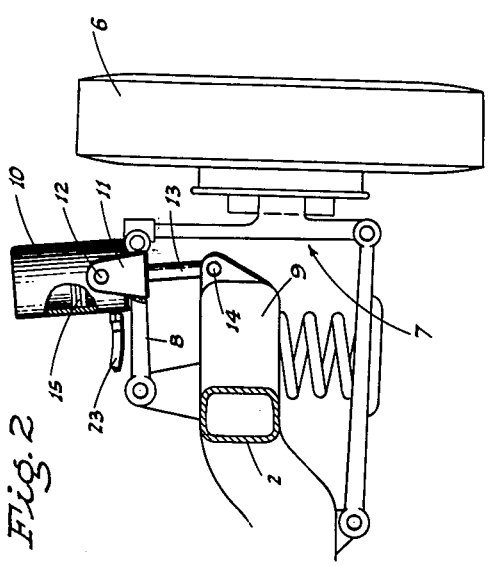
Inventor
*Emmitt M. Tucker*
By
*Webster & Webster*
ATTORNEYS

United States Patent Office 2,728,583
Patented Dec. 27, 1955

2,728,583

CAR BODY LIFT

Emmitt M. Tucker, Medford, Oreg., assignor to Tucker & Sons, Grass Valley, Calif., a corporation of California Application August 15, 1951, Serial No. 242,021

1 Claim. (Cl. 280—44)

In present-day motor vehicles, especially passenger automobiles, the chassis is relatively low-hung, whereby to provide a lower center of gravity, as is desirable for highway travel. However, such a low-hung chassis is objectionable when rough rutty roads are encountered, as certain under-chassis parts tend to strike ground or scrape, frequently with damage to such parts.

The present invention is therefore directed to, and it is the major object to provide, a novel lift mechanism between the chassis frame and the wheel supports; such lift mechanism normally being inactive and offering no resistance to springing motion of the chassis, but being operative at the will of the operator to power lift the chassis relative to the wheels a substantial distance, whereby when a rough rutty road, or a road with ground obstacles, is encountered, the chassis can be lifted to a clearance position.

Another important object of the present invention is to provide a lift mechanism, as in the preceding paragraph and for the recited purpose, which comprises an upstanding power cylinder corresponding to each wheel and connected between the chassis frame and the wheel support; such power cylinders normally being inactive, with the pistons intermediate the ends of the cylinders whereby to permit of the necessary free play.

An additional object of the invention is to provide a lift mechanism, as above, wherein said power cylinders are adapted to be simultaneously actuated by means of a fluid pressure supply conduit system which includes a manually controlled valve in the operator's compartment.

It is also an object of the invention to provide a lift mechanism for the purpose described which is rugged in structure; designed for ease and economy of manufacture; and capable of being readily installed on a conventional motor vehicle.

Still another object of the invention is to provide a practical and reliable car body lift, and one which will be exceedingly effective for the purpose for which it is designed.

These objects are accomplished by means of such structure and relative arrangement of parts as will fully appear by a perusal of the following specification and claim.

In the drawings:

Fig. 1 is a perspective view of the lift mechanism as applied in connection with the chassis of a motor vehicle; the chassis being shown diagrammatically and in dotted lines.

Fig. 2 is an enlarged fragmentary front elevation of one of the front wheel mounts showing the corresponding power cylinder as arranged in connection therewith.

Fig. 3 is an enlarged sectional elevation through the rear axle of the vehicle showing one of the rear power cylinders as connected between said axle and an adjacent portion of the chassis frame.

Referring now more particularly to the characters of reference on the drawings, the numeral 1 indicates generally a relatively low-hung chassis of a motor vehicle, which chassis includes a frame 2 supported, at its rear end, by rear wheels 3 on a rear axle 4 secured to springs 5, which in turn are connected at the ends to the frame 2 in conventional manner.

At the front the frame 2 is supported by front wheels 6 secured to the frame by front wheel mounts 7, each of which includes a part in the form of a vertically swingable yoke 8 disposed above a corresponding end portion of the front cross beam 9 of frame 2.

A fluid pressure actuated power cylinder 10 is mounted in upstanding position in connection with each yoke 8 by means of a bracket 11 and a pivot 12; each power cylinder 10 being inverted with its piston rod 13 projecting downwardly to a pivotal anchor 14 on the adjacent end of the front cross beam 9 of frame 2.

The piston 15 of each front power cylinder 10 is normally disposed intermediate the ends of said cylinder.

An upstanding fluid pressure actuated power cylinder 16 is disposed above each end portion of the axle 4; the lower end of each cylinder 16 being pivoted, as at 17, to a clamp 18 on the rear axle 4. The piston rod 19 of each of the rear power cylinders 16 projects upwardly and is pivoted, as at 20, to a bracket 21 fixed on the adjacent portion of the frame 2. Within each rear power cylinder 16 the piston 22 normally rests between the ends of said cylinder.

As the piston 15 in each front power cylinder 10 and the piston 22 in each rear power cylinder 16 are normally in an intermediate position and not under pressure, such cylinders are free to extend and contract with the normal spring action of the chassis.

The following fluid pressure supply conduit system is provided for the purpose of simultaneously energizing all four of the power cylinders:

A conduit 23, flexible in part, leads from each of the power cylinders 10 and 16, being in communication with the same at the bottom. The four conduits 23 connect to a central manifold 24, which in turn is connected in communication with a supply conduit 25 which leads to an air pressure tank 26 mounted on the chassis at a suitable point. Air is maintained under pressure in the tank 26 by a pump 27 driven in any suitable manner (not shown) from the vehicle engine.

The supply conduit 25 has a valve 28 interposed therein, such valve being disposed for ready manual access in the operators' compartment of the vehicle. The valve 28 is of a type which in one position connects the tank 26 in communication with the conduits 23, and in another position relieves the pressure in such conduits through a vent 29.

When the operator desires to raise the relatively low-hung chassis 1 for the purpose of traversing a rough rutty road, or to clear some obstacle, the valve 28 is manipulated to a position wherein air pressure delivers from the tank 26, through conduit 25 and manifold 24 into the conduits 23, thence delivering to the power cylinders 10 and 16.

As the air pressure enters the front power cylinders 10, working against the pistons 15 from below, such power cylinders relatively contract, lifting the frame 2 at the front relative to the front wheel mounts 7. Simultaneously, the air pressure entering the rear power cylinders 16 and working against the pistons 22 from below causes said cylinders 16 to extend, pushing the frame 2 upwardly at the rear relative to the axle 4.

Consequently, there is simultaneous and substantially even lift of the frame 2, both front and rear, for the described purpose.

While the lift mechanism is relatively simple in its structure and mounting, it is nevertheless quite practical and reliable for the purpose of providing a higher than normal position of the chassis 1 when road conditions are met which such chassis will not readily clear when in its low-hung position.

From the foregoing description it will be readily seen that there has been provided such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a motor vehicle having a normally relatively low-hung chassis frame, and a rear wheel axle and front wheel mounts in spring relation to the frame; the axle being below the frame and each front wheel mount including a part above the frame; a separate fluid pressure actuated power unit corresponding to each wheel and comprising a cylinder and a piston rod, means mounting the rear power cylinders in connection with the axle and the pistons thereof in connection with the frame, means mounting the front power cylinders on and projecting upwardly from the corresponding front wheel mount part and the pistons thereof on the frame, and means to simultaneously deliver fluid pressure to the lower end of all the cylinders to cause the rear power units to extend in effective length and the front power units to contract in effective length.

References Cited in the file of this patent

UNITED STATES PATENTS

| | | |
|---|---|---|
| 1,109,146 | Phillips | Sept. 1, 1914 |
| 1,554,457 | Myers | Sept. 22, 1925 |
| 1,760,891 | Wilkey | June 3, 1930 |
| 1,869,285 | Taber | July 26, 1932 |
| 2,480,909 | Davis | Sept. 6, 1949 |
| 2,490,719 | Tank | Dec. 6, 1949 |
| 2,560,625 | Boggs, Jr. | July 17, 1951 |
| 2,573,119 | Torres | Oct. 30, 1951 |
| 2,623,758 | Cruz | Dec. 30, 1952 |
| 2,644,696 | Bill | July 7, 1953 |
| 2,665,920 | White | Jan. 12, 1954 |